(12) United States Patent
Li et al.

(10) Patent No.: US 10,638,141 B2
(45) Date of Patent: Apr. 28, 2020

(54) BITSTREAM GENERATION METHOD AND APPARATUS, BITSTREAM PROCESSING METHOD AND APPARATUS, AND SYSTEM

(71) Applicant: ZTE Corporation, Shenzhen (CN)

(72) Inventors: Ming Li, Shenzhen (CN); Ping Wu, Shenzhen (CN); Guoqiang Shang, Shenzhen (CN); Yutang Xie, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 100 days.

(21) Appl. No.: 15/107,730

(22) PCT Filed: Oct. 15, 2014

(86) PCT No.: PCT/CN2014/088677
§ 371 (c)(1),
(2) Date: Jun. 27, 2016

(87) PCT Pub. No.: WO2015/096540
PCT Pub. Date: Jul. 2, 2015

(65) Prior Publication Data
US 2016/0323590 A1  Nov. 3, 2016

(30) Foreign Application Priority Data
Dec. 27, 2013 (CN) .......................... 2013 1 0739934

(51) Int. Cl.
*H04N 19/196* (2014.01)
*H04N 19/103* (2014.01)
(Continued)

(52) U.S. Cl.
CPC ......... *H04N 19/196* (2014.11); *H04N 19/103* (2014.11); *H04N 19/136* (2014.11);
(Continued)

(58) Field of Classification Search
CPC .. H04N 19/196; H04N 19/597; H04N 19/172; H04N 19/136; H04N 19/103
(Continued)

(56) References Cited

U.S. PATENT DOCUMENTS

| 9,628,820 B2* | 4/2017 | Wang | H04N 19/70 |
| 2005/0201471 A1* | 9/2005 | Hannuksela | H04N 21/44004 375/240.25 |

(Continued)

FOREIGN PATENT DOCUMENTS

| CN | 101170697 A | 4/2008 |
| CN | 101299649 A | 11/2008 |

(Continued)

OTHER PUBLICATIONS

International Search Report for corresponding application PCT/CN2014/088677 filed on Oct. 15, 2014; dated Jan. 21, 2015.

(Continued)

*Primary Examiner* — Zaihan Jiang
(74) *Attorney, Agent, or Firm* — Cantor Colburn LLP

(57) ABSTRACT

Provided are a bitstream generation method and apparatus, a bitstream processing method and apparatus, and a system. The bitstream generation method includes that: it is judged whether it is needed to execute a Picture Order Count (POC) alignment operation on an entire bitstream and/or a part of the bitstream according to an application requirement; and identification and control information is written into the bitstream according to a judgment result, wherein the identification and control information includes: information indicating whether to execute the POC alignment operation on the entire bitstream and/or a part of the bitstream. The flexibility in bitstream control can be improved.

14 Claims, 3 Drawing Sheets

(51) Int. Cl.
*H04N 19/136* (2014.01)
*H04N 19/172* (2014.01)
*H04N 19/597* (2014.01)
*H04N 19/70* (2014.01)
*H04N 19/433* (2014.01)
*H04N 19/30* (2014.01)

(52) U.S. Cl.
CPC .......... *H04N 19/172* (2014.11); *H04N 19/30* (2014.11); *H04N 19/433* (2014.11); *H04N 19/597* (2014.11); *H04N 19/70* (2014.11)

(58) Field of Classification Search
USPC ............................................. 375/240, 240.02
See application file for complete search history.

(56) References Cited

U.S. PATENT DOCUMENTS

| | | | | |
|---|---|---|---|---|
| 2009/0252218 A1* | 10/2009 | Nakagawa | ............. | H04N 19/70 |
| | | | | 375/240.01 |
| 2013/0107953 A1* | 5/2013 | Chen | ............. | H04N 19/70 |
| | | | | 375/240.12 |
| 2013/0182755 A1 | 7/2013 | Chen | | |
| 2014/0301439 A1* | 10/2014 | Chen | ............. | H04N 19/70 |
| | | | | 375/240.02 |
| 2015/0103886 A1* | 4/2015 | He | ............. | H04N 19/188 |
| | | | | 375/240.02 |
| 2015/0103912 A1* | 4/2015 | Lee | ............. | H04N 19/577 |
| | | | | 375/240.15 |
| 2015/0139320 A1* | 5/2015 | Wang | ............. | H04N 19/70 |
| | | | | 375/240.15 |
| 2015/0172667 A1* | 6/2015 | Hendry | ............. | H04N 19/105 |
| | | | | 375/240.25 |
| 2016/0088306 A1* | 3/2016 | Sjoberg | ............. | H04N 19/187 |
| | | | | 375/240.02 |
| 2016/0241835 A1* | 8/2016 | Ikai | ............. | H04N 19/70 |
| 2016/0241850 A1* | 8/2016 | Deshpande | ............. | H04N 19/70 |
| 2017/0013259 A1* | 1/2017 | Li | ............. | H04N 19/597 |

FOREIGN PATENT DOCUMENTS

| | | |
|---|---|---|
| CN | 102685469 A | 9/2012 |
| CN | 103379320 A | 10/2013 |
| CN | 103379333 A | 10/2013 |

OTHER PUBLICATIONS

European Search Report for corresponding application EP 14 87 5097; Report dated Sep. 8, 2016.
Henry, et al., "MV-HEVC/SHVC HLS: On Picture order count", Joint Collaborative Team on Video Coding of ISO/IEC JTC1/SC29/WG11 and ITU-T SG.16, Dec. 12, 2013, XP030115501.
Ramasubramonian A, et al, "MV-HEVC/SHVC HLS: On picture order count", JCT-VC Meeting, Oct. 23, 2015, XP030115261.
Stephan Wenger, et al, "APS partial update through referencing", JCT-VC Meeting, Jan. 20, 2012, XP030111096.

* cited by examiner

BITSTREAM GENERATION METHOD AND APPARATUS, BITSTREAM PROCESSING METHOD AND APPARATUS, AND SYSTEM

TECHNICAL FIELD

The present disclosure relates to the technical field of picture transmission, and in particular to a bitstream generation method and apparatus, a bitstream processing method and apparatus, and a system.

BACKGROUND

In the ongoing standardization tracks based on H.265/ High Efficiency Video Coding (HEVC) while providing backward compatibility, i.e. scalable video coding and a Three-Dimensional Video (3DV) coding including MV-HEVC (HEVC multi-view video coding extension framework) and 3D-HEVC (3D High Efficiency Video Coding), a unified common high-level structural design is adopted. The unified structural design is based on a multi-layer video coding, which introduces a concept of "layer" to represent texture components and depth components of the MV-HEVC and the 3D-HEVC and different scalable layers of the scalable video coding, and to indicate different views and scalable layers by means of layer identifiers (Layer Ids). A currently issued H.265/HEVC standard is referred to as H.265/HEVC Version 1 standard.

In multi-layer video coding, video pictures obtained at the same time instant and corresponding coding bits constitute an Access Unit (AU). In the same AU, each layer of pictures may use different coding methods. In such a way, in the same AU, a certain layer of pictures may be an Intra Random Access Point (IRAP) picture servable as a random point, and one or more of pictures on other layers are common inter-frame and inter-layer predicted coding pictures. In practical application, different layers may select respective IRAP picture insertion policies according to a network transmission situation, a video content changing and the like. For example, a shorter IRAP picture insertion period may be adopted for video pictures on a Base Layer (BL) compatible with H.265/HEVC, and a relatively longer IRAP picture insertion period may be adopted for a video picture on an Enhancement Layer (EL). In such a way, by means of a layer-wise accessed multi-layer video coding structure, random access performance of a multi-layer video coding bitstream may be ensured without sharp increment in coding bit-rate.

A BL bitstream in the multi-layer video coding bitstream should be compatible with the H.265/HEVC Version 1 standard. That is, the multi-layer video coding bitstream should ensure that a decoder designed according to the H.265/HEVC Version 1 standard can correctly decode the BL bitstream extracted from the multi-layer video coding bitstream. Specifically, for the MV-HEVC and the 3D-HEVC, the BL corresponds to a base view or an independent view, and the EL corresponds to an enhancement view or a dependent view. In practical application, a base view bitstream only used for being played by a traditional two-dimensional television, a dual-view bitstream supporting three-dimensional display and a multi-view bitstream for three-dimensional display may be obtained by means of a method for extracting the multi-layer video coding bitstream.

In the H.265/HEVC Version 1 standard, there are three types of IRAP pictures, namely an Instantaneous Decoding Refresh (IDR) picture, a Broken Link Access (BLA) picture and a Clean Random Access (CRA) picture. The three pictures are coded in an intra coding mode and decoded without depending on other pictures. The three picture types are different in operations on Picture Order Count (POC) and Decoded Picture Buffer (DPB).

The POC is an order count configured to identify a picture displaying order in H.265/HEVC Version 1. According to the H.265/HEVC Version 1 standard, a POC value of a picture is composed of two parts. If the POC value of the picture is represented by PicOrderCntVal, PicOrderCntVal=PicOrderCntMsb+PicOrderCntLsb, where PicOrderCntMsb represents a Most Significant Bit (MSB) value of the POC value of the picture, and PicOrderCntLsb represents a Least Significant Bit (LSB) value of the POC value of the picture. Generally, the PicOrderCntMsb value is equal to a PicOrderCntMsb value of a previous picture (TemporalId=0) with respect to a current picture according to a decoding order, and the PicOrderCntLsb value is equal to a value of a slice_pic_order_cnt_lsb field in slice header information. The number of bits for representing slice_pic_order_cnt_lsb field in the bitstream is signalled by log 2_max_pic_order_cnt_lsb_minus4 in a Sequence Parameter Set (SPS), and the number of bits for representing slice_pic_order_cnt_lsb in the bitstream is determined as log 2_max_pic_order_cnt_lsb_minus4+4.

In the H.265/HEVC Version 1, if a current picture is an IDR picture, a PicOrderCntMsb value is set as 0, slice header information does not contain a slice_pic_order_cnt_lsb field, and a PicOrderCntLsb value defaults to 0. If a current picture is a BLA picture, a PicOrderCntMsb value is set as 0, slice header information contains a slice_pic_order_cnt_lsb field configured to determine a PicOrderCntLsb value. If a current picture is a CRA picture and a flag bit HandleCraAsBlaFlag value is equal to 0, the POC is calculated by means of a general method; and if a current picture is a CRA picture and a flag bit HandleCraAsBlaFlag value is equal to 1, the POC value of the CRA picture is calculated by means of a BLA picture method.

It is important to note that in multi-layer video coding standard, the slice header information of the EL always contains a slice_pic_order_cnt_lsb field regardless of corresponding picture type.

On this basis, for the multi-layer video coding bitstream, in order to ensure that pictures at the same time can be detected in DPB detection process and to make it convenient for a decoder to determine a start/end position of each AU in the bitstream using the POC value, it is required that all pictures in the AUs have the same POC value. For a layer-wise coding structure, each AU probably contains IRAP pictures and non-IRAP pictures at the same time. In such a way, if the IRAP pictures are an IDR picture and a BLA picture, the POC values of the pictures contained in this AU will be different. As a result, it is necessary to design a POC alignment function for the multi-layer video coding standard so as to meet that all pictures in the AUs may have the same POC when using the layer-wise structure.

In order to solve the problem, a POC alignment method is proposed in a JCT-VC standard conference proposal JCTVC-N0244. The method refers to adding a poc_reset_flag field of which the length is 1 bit by using a reserved bit in slice header information. When a value of the field is equal to 1, a POC value of a picture is calculated in accordance with a general method, then a so-called POC shifting operation is performed as subtracting the calculated POC value from the POC values of the pictures in the same layer (including BL) in DPB, and finally the POC value of the picture is set to be 0.

The main defect of the method is that a BL bitstream cannot be compatible with the H.265/HEVC Version 1 standard, that is, it cannot be ensured that the decoder conforming to the H.265/HEVC Version 1 standard can decode the BL bitstream extracted from the multi-layer video coding bitstream.

In order to solve the problem of computability, it was proposed in JCT-VC conference proposals JCTVC-O0140 and JCTVC-O0213 that only an MSB in the POC is set as 0 when it is needed to perform POC alignment on the basis of the JCTVC-N0244. Furthermore, an option of delaying POC alignment is added in the JCTVC-O0213 to deal with application scenario of losing a slice with a flag bit indicating a reset of POC value and application scenario of different frame rates among layers. It was proposed in JCTVC-O0176 that POC alignment is directly performed in the case of an IDR picture without adoption of an explicit signalling by a flag bit in slice header, while adding a reserved bit into slice header of an IDR picture in BL bitstream so as to be configured to calculate a POC value if the picture is a CRA picture rather than an IDR picture. The calculated POC value is configured for performing a POC shifting operation on pictures stored in DPB of ELs. It was proposed in JCTVC-O0275 with a concept of a layer POC, which maintains two sets of different POCs for the pictures on the EL. The layer POC is a POC value obtained under the condition that POC alignment is not performed, and the value of layer POC is configured for relevant operations of a decoding algorithm for Reference Picture Set (RPS) and the like. The other set of POC is the POC subjected to POC alignment. The aligned POC value is consistent with that of a picture on the BL in the same AU, and the aligned POC value is configured to control picture output and displaying processes. According to a method proposed by the proposal JCTVC-O0275, information of the BL is adopted in a POC alignment process, a variable flag maintained inside an encoder/decoder is configured to trigger the POC alignment process, and a value of the flag is associated with picture type information of the BL.

Under most conditions, it is needed to perform POC alignment on a multi-layer video, and pictures on layers within the same AU are of the same POC value, thereby facilitating picture output control, AU boundary detection and other operations. In spite of this, it is unnecessary to perform POC alignment on some applications. For example, in uncoordinated simulcast, as a certain period of time is only applicable to a video bitstream on a BL or a certain individual EL, under this circumstance, it is unnecessary to perform POC alignment in this bitstream; and if a simulcast bitstream is extracted, edited and recombined, it is unnecessary to perform POC alignment in a bitstream generation process. In addition, a BL and one or more ELs for hybrid scalable video coding are coded by using different video coding standards. Since different coding standards adopt different POC mechanisms and POC-based picture output control operation modes, under the hybrid scalable video coding, it may also be unnecessary to execute a POC alignment operation. In addition, pictures acquired at the same time may be aligned at displaying time by means of timing information added by the processes of system layer or media file packaging for the multi-layer video coding bitstream, and in this case, it is unnecessary to perform POC alignment on a video bitstream.

It can be seen that the method proposed in JCTVC-NO244 implicitly derives the POC alignment operations from BL information or prediction structure information rather than explicitly signalling by flag bit. As a result, in the case that a predictive structure meets certain conditions so that the POC alignment operations are to be executed while POC alignment is not actually needed for that instance, no option is available to disable the unnecessary POC alignment operations partially and/or entirely.

SUMMARY

The embodiments of the present disclosure provide a bitstream generation method and apparatus, a bitstream processing method and apparatus, and a system, which are intended to solve, at least, the above problems in the related art.

According to an embodiment of the present disclosure, a bitstream generation method is provided, which may include that: it is judged whether it is needed to execute a POC alignment operation on an entire bitstream and/or a part of the bitstream according to an application requirement; and identification and control information is written into the bitstream according to a judgment result, wherein the identification and control information includes: information indicating whether to execute the POC alignment operation on the entire bitstream and/or a part of the bitstream.

In an exemplary embodiment, the identification and control information may be written into a field, where one or more parameter sets are located, in the bitstream, and may be used for indicating whether to execute the POC alignment operation on all and/or a part of pictures, which use the one or more parameter sets where the identification and control information is located, in the bitstream.

In an exemplary embodiment, the one or more parameter sets may include at least one of: a Video Parameter Set (VPS), an SPS and a Picture Parameter Set (PPS).

In an exemplary embodiment, when multiple parameter sets contain the identification and control information indicating whether to execute the POC alignment operation, the identification and control information, indicating whether to execute the POC alignment operation, in a current parameter set may override the corresponding identification and control information, indicating whether to execute the POC alignment operation, in a parameter set to which the current parameter set directly and/or indirectly refers according to a referring relationship among the multiple parameter sets.

In an exemplary embodiment, the identification and control information may be written into in one or more fields, which correspond to data structures acting at least on picture level, other than the parameter set field in the bitstream, and may be used for indicating whether to execute the POC alignment operation on all and/or a part of pictures within an effective range of the data structures of the bitstream.

In an exemplary embodiment, the identification and control information may be written into a field, where Supplemental Enhancement Information (SEI) is located, in the bitstream, and may be used for indicating whether to execute the POC alignment operation on all and/or a part of pictures in the bitstream within an effective range of the SEI.

In an exemplary embodiment, the identification and control information may be written into in a field, used for describing a video media attribute, of a system layer of the bitstream, and may be used for indicating whether to execute the POC alignment operation on all and/or a part of pictures of the bitstream contained in a system bitstream.

In an exemplary embodiment, the identification and control information may be written into in a field, used for describing a video media attribute, in a media file of the bitstream, and may be used for indicating whether to execute the POC alignment operation on all and/or a part of pictures of the bitstream contained in the media file.

In an exemplary embodiment, the identification and control information may further include: start picture position information of enabling or disabling of the POC alignment operation and/or end picture position information of enabling or disabling of the POC alignment operation. Before the identification and control information is written into the bitstream, the method may further include that: according to a predictive structure and the application requirement, a start position and/or an end position of a section of successive pictures, for which the POC alignment operation is enabled and/or disabled, arranged in a picture displaying order or a picture decoding order are/is determined.

According to another embodiment of the present disclosure, a bitstream generation apparatus is provided, which may include: a judgment component, configured to judge whether it is needed to execute a POC alignment operation on an entire bitstream and/or a part of the bitstream according to an application requirement; and a writing component, configured to write identification and control information into the bitstream according to a judgment result, wherein the identification and control information includes: information indicating whether to execute the POC alignment operation on the entire bitstream and/or a part of the bitstream.

In an exemplary embodiment, the identification and control information may further include: start picture position information of enabling or disabling of the POC alignment operation and/or end picture position information of enabling or disabling of the POC alignment operation. The apparatus may further include: a determination component, configured to determine, according to a predictive structure and the application requirement, a start position and/or an end position of a section of successive pictures, for which the POC alignment operation is enabled and/or disabled, arranged in a picture displaying order or a picture decoding order.

According to another embodiment of the present disclosure, a bitstream processing method is provided, which may include that: identification and control information is acquired from a bitstream, wherein the identification and control information includes: information indicating whether to execute a POC alignment operation on the entire bitstream and/or a part of the bitstream; and according to an indication of the identification and control information, the POC alignment operation is executed on all and/or a part of pictures, on which the POC alignment operation is needed to be executed, in the bitstream.

In an exemplary embodiment, the identification and control information may be acquired from a field, where one or more parameter sets are located, in the bitstream, and may be used for indicating whether to execute the POC alignment operation on all and/or a part of pictures, which use the one or more parameter sets where the identification and control information is located, in the bitstream.

In an exemplary embodiment, the one or more parameter sets may include at least one of: a VPS, an SPS and a PPS.

In an exemplary embodiment, when multiple parameter sets contain the identification and control information indicating whether to execute the POC alignment operation, the identification and control information, indicating whether to execute the POC alignment operation, in a current parameter set may override the corresponding identification and control information, indicating whether to execute the POC alignment operation, in a parameter set to which the current parameter set directly and/or indirectly refers according to a referring relationship among the multiple parameter sets.

In an exemplary embodiment, the identification and control information may be acquired from in one or more fields, which correspond to data structures acting at least on picture level, other than the parameter set field in the bitstream, and may be used for indicating whether to execute the POC alignment operation on all and/or a part of pictures within an effective range of the data structures of the bitstream.

In an exemplary embodiment, the identification and control information may be acquired from in a field, where SEI is located, in the bitstream, and may be used for indicating whether to execute the POC alignment operation on all and/or a part of pictures in the bitstream within an effective range of the SEI.

In an exemplary embodiment, the identification and control information may be acquired from in a field, used for describing a video media attribute, of a system layer of the bitstream, and may be used for indicating whether to execute the POC alignment operation on all and/or a part of pictures of the bitstream contained in a system bitstream.

In an exemplary embodiment, the identification and control information may be acquired from in a field, used for describing a video media attribute, in a media file of the bitstream, and may be used for indicating whether to execute the POC alignment operation on all and/or a part of pictures of the bitstream contained in the media file.

In an exemplary embodiment, the step that the POC alignment operation is executed on all and/or a part of pictures, on which the POC alignment operation is needed to be executed, in the bitstream according to the indication of the identification and control information may include that: according to an effective range of one or more fields from which the identification and control information is acquired and a value of the identification and control information, pictures, for which the POC alignment operation is enabled and/or disabled, in the bitstream are determined; and the POC alignment operation is executed on the pictures for which the POC alignment operation is enabled.

According to another embodiment of the present disclosure, a bitstream processing apparatus is provided, which may include: an acquisition component, configured to acquire identification and control information from a bitstream, wherein the identification and control information includes: information indicating whether to execute a POC alignment operation on the entire bitstream and/or a part of the bitstream; and an execution component, configured to execute, according to an indication of the identification and control information, the POC alignment operation on all and/or a part of pictures, on which the POC alignment operation is needed to be executed, in the bitstream.

In an exemplary embodiment, the execution component may include: a determination component, configured to determine, according to an effective range of one or more fields from which the identification and control information is acquired and a value of the identification and control information, pictures, for which the POC alignment operation is enabled and/or disabled, in the bitstream; and a control component, configured to execute the POC alignment operation on the pictures for which the POC alignment operation is enabled.

According to another embodiment of the present disclosure, a communication system using a bitstream is provided, which may include: a source device, including the bitstream generation apparatus; and a destination device, including the bitstream processing apparatus.

By means of the embodiments of the present disclosure, when a bitstream is generated, indication and control information indicating whether it is needed to execute a POC alignment operation on the entire bitstream and/or a part of the bitstream is written into the bitstream, so that the POC alignment operation can be partially and/or entirely disabled, and the flexibility in bitstream control is improved.

BRIEF DESCRIPTION OF THE DRAWINGS

The drawings illustrated herein are intended to provide further understanding of the present disclosure, and constitute a part of the present disclosure. The schematic embodiments and illustrations of the present disclosure are intended to explain the present disclosure, and do not form improper limits to the present disclosure. In the drawings.

DETAILED DESCRIPTION OF THE EMBODIMENTS

The present disclosure will be illustrated below with reference to the drawings and the embodiments in detail. It is important to note that the embodiments of the present disclosure and the characteristics in the embodiments can be combined under the condition of no conflicts.

When it is needed to perform POC alignment, an encoder may generate a multi-layer video coding bitstream by means of an existing POC alignment method, and a decoder may obtain a POC value of a current picture by means of a decoding method corresponding to a POC alignment method in the related art. It is unnecessary to perform POC alignment on some applications such as an uncoordinated simulcast application and a hybrid scalable video coding application.

As a consequence, in the embodiments of the present disclosure, in order to improve the flexibility of a multi-layer video encoder/decoder and a bitstream and to meet various application requirements, identification information and corresponding operations for a POC alignment operation are added to a high-level data flow of multi-layer video coding.

It is important to note that in the embodiments of the present disclosure, a source device refers to a device containing an encoder and capable of generating a multi-layer video coding bitstream and performing necessary file and system layer processing; and a destination device refers to a device containing a decoder and capable of performing necessary file and system layer processing and decoding the multi-layer video coding bitstream.

Embodiment 1

According to the embodiment of the present disclosure, a bitstream generation method is provided.

Figure 1:
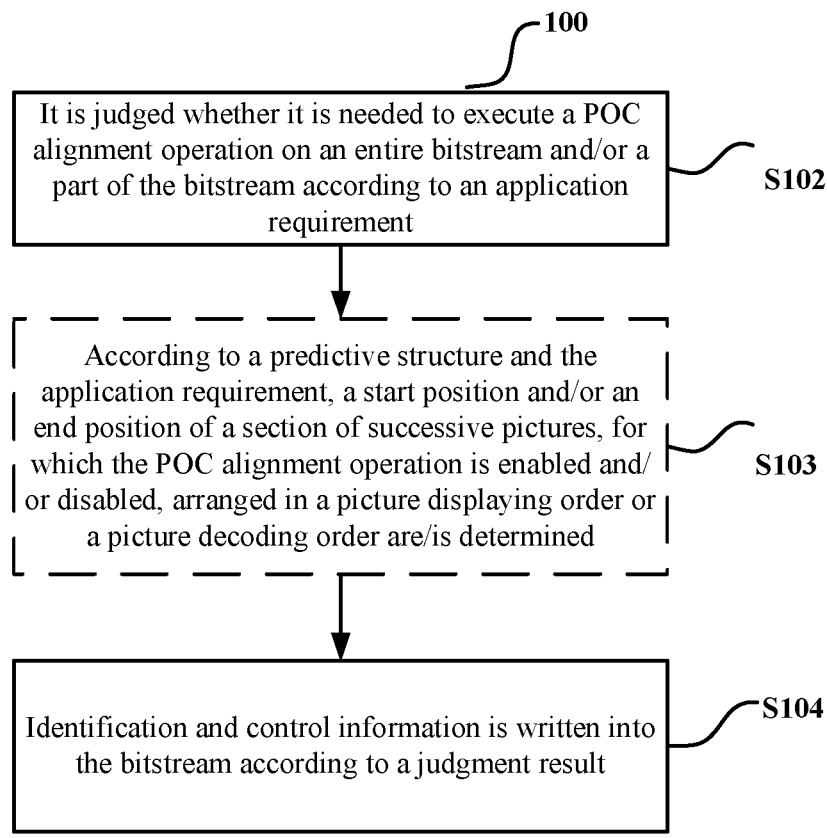
FIG. 1 is a flow chart of a bitstream generation method 100 according to an embodiment of the present disclosure.

FIG. 1 is a flow chart of a bitstream generation method 100 according to an embodiment of the present disclosure. As shown in FIG. 1, the bitstream generation method according to the embodiment of the present disclosure includes Step S102 and Step S104. In Step S102, it is judged whether it is needed to execute a POC alignment operation on an entire bitstream and/or a part of the bitstream according to an application requirement (indicating, for example, whether to decode and output pictures on multiple or all layers simultaneously). Then, in Step S104, identification and control information is written into the bitstream according to a judgment result, wherein the identification and control information includes: information indicating whether to execute the POC alignment operation on the entire bitstream and/or a part of the bitstream.

In a specific implementation process, when it is needed to transmit the bitstream, the source device may execute Step S102 and Step S104, and may write the identification and control information for the POC alignment operation into the transmitted bitstream.

The bitstream in the embodiments of the present disclosure may be a multi-layer video bitstream or may be any other bitstreams on system layer, which will not be limited in the embodiment of the present disclosure specifically.

By means of Step S102 and Step S104, identification information and corresponding operations for the POC alignment operation may be added to a high-level data flow of multi-layer video coding according to the application requirement, thereby improving the flexibility of a multi-layer video encoder/decoder and the bitstream.

In the embodiment of the present disclosure, an effective range of the identification and control information may be indicated by different fields in the bitstream into which the identification and control information is written. In the embodiment of the present disclosure, the identification and control information may be written into at least one of the following positions in the bitstream: an existing parameter set field in a video bitstream; one or more fields corresponding to data structures acting, at least, on picture level, other than a parameter set in the video bitstream; a field, where SEI is located, in the video bitstream; a field, used for describing a video media attribute, of a system layer; and a field, used for describing the video media attribute, of a media file.

Optionally, in the embodiment of the present disclosure, the identification and control information includes, but is not limited to, the following modes to indicate whether to execute the POC alignment operation on pictures.

(1) The identification and control information is written into a field, where one or more parameter sets are located, in the bitstream, and is used for indicating whether to execute the POC alignment operation on picture level using the one or more parameter sets where the identification and control information is located in the bitstream, wherein the one or more parameter sets include at least one of: a VPS, an SPS and a PPS. For example, when the identification and control information is located in the VPS, a control range of the identification and control information covers all picture layers of a multi-layer video; when the identification and control information is located in the SPS, a control range of the identification and control information covers picture layers, using the SPS, of the multi-layer video; and when the identification and control information is located in the PPS, a control range of the identification and control information covers picture layers, using the PPS, of the multi-layer video.

Under this circumstance, when multiple parameter sets contain the identification and control information indicating whether to execute the POC alignment operation, the identification and control information, indicating whether to execute the POC alignment operation, in a current parameter set may override the corresponding identification and control information, indicating whether to execute the POC alignment operation, in a parameter set to which the current parameter set directly and/or indirectly refers according to a referring relationship among the multiple parameter sets.

(2) The identification and control information is written into one or more fields, which correspond to data structures acting at least on picture level, other than the parameter set field in the bitstream, and is used for indicating whether to execute the POC alignment operation on the picture layers on which the data structures of the bitstream act, wherein an effective range of the data structures contains, at least, a picture (a frame picture and/or a field picture).

(3) The identification and control information is written into a field, where SEI is located, in the bitstream, and is used for indicating whether to execute the POC alignment operation on pictures in the bitstream within an effective range of the SEI.

(4) The identification and control information is written into a field (that is, a system layer descriptor), used for describing a video media attribute, of a system layer of the bitstream, and is used for indicating whether to execute the POC alignment operation on all and/or a part of pictures of the bitstream contained in a system bitstream.

(5) The identification and control information is written into a field (that is, a file descriptor), used for describing the video media attribute, of a media file of the bitstream, and is used for indicating whether to execute the POC alignment operation on all and/or a part of pictures of the bitstream contained in the media file.

The identification and control information may be written into the multiple positions simultaneously and may indicate whether to execute the POC alignment operation on pictures within a plurality of ranges.

Optionally, in the embodiment of the present disclosure, the identification and control information further includes: start picture position information of enabling or disabling of the POC alignment operation and/or end picture position information of enabling or disabling of the POC alignment operation. As shown in FIG. 1, before Step S104, the method 100 may further include Step S103 as follows. Step S103: According to a predictive structure and the application requirement, a start position and/or an end position of a section of successive pictures, for which the POC alignment operation is enabled and/or disabled, arranged in a picture displaying order or a picture decoding order are/is determined.

Optionally, in the embodiment of the present disclosure, after the identification and control information is written into a bitstream, the bitstream may be transmitted, and a receiving side, which may be called a destination device, receives the multi-layer video bitstream, acquires the identification and control information from the multi-layer video bitstream, and executes a decoding operation and/or a displaying operation on the multi-layer video bitstream according to an indication of the identification and control information. For example, according to the identification and control information, a bitstream for which the POC alignment operation is enabled and/or disabled is determined, and the POC alignment operation is executed on the bitstream for which the POC alignment operation is enabled and/or disabled during decoding and/or displaying.

Embodiment 2

According to the embodiment of the present disclosure, a bitstream generation apparatus is provided. The apparatus is configured to implement the method provided according to the embodiment 1.

Figure 2:
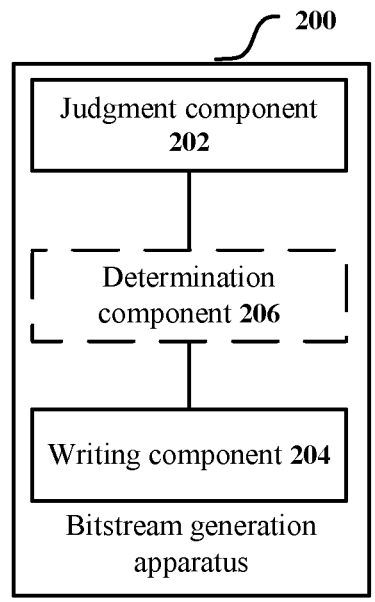
FIG. 2 is a structural diagram of a bitstream generation apparatus 200 according to an embodiment of the present disclosure.

FIG. 2 is a structural diagram of a bitstream generation apparatus 200 according to an embodiment of the present disclosure. As shown in FIG. 2, the generation apparatus 200 may include: a judgment component 202 and a writing component 204. It will be appreciated that a connection relationship between both components shown in FIG. 2 is merely exemplary. Those skilled in the art may completely adopt other connection relationships as long as each component can achieve functions of the present disclosure under such connection relationships.

In the description, a function of each component may be implemented by means of dedicated hardware or hardware capable of being combined with appropriate software to execute processing. The hardware or the dedicated hardware may include an Application Specific Integrated Circuit (ASIC), various other circuits, various processors and the like. When being implemented by processors, the function may be provided by a single dedicated processor, a single shared processor, or a plurality of independent processors (some processors therein being probably shared). In addition, the processors shall not be interpreted as specially referring to hardware capable of executing software, and may implicitly include, but is not limited to, Digital Signal Processor (DSP) hardware, a Read-Only Memory (ROM) configured to store software, a Random Access Memory (RAM) and a non-volatile storage device instead.

In the embodiment of the present disclosure, the judgment component 202 is configured to judge whether it is needed to execute a POC alignment operation on an entire bitstream and/or a part of the bitstream according to an application requirement; and the writing component 204 is configured to write identification and control information, including information indicating whether to execute the POC alignment operation on the entire multi-layer video bitstream and/or a part of the multi-layer video bitstream, into the bitstream according to a judgment result of the judgement component 202.

In correspondence to the embodiment 1, the writing component 204 may indicate whether the POC alignment operation is enabled or disabled for the entire multi-layer video bitstream and/or a part of the multi-layer video bitstream by writing the identification and control information to different fields in the multi-layer video bitstream, which will not be elaborated.

Optionally, the identification and control information further includes: start picture position information of enabling or disabling of the POC alignment operation and/or end picture position information of enabling or disabling of the POC alignment operation. As shown in FIG. 2, the apparatus 200 may further include: a determination component 206, configured to determine, according to a predictive structure and the application requirement, a start position and/or an end position of a section of successive pictures, for which the POC alignment operation is enabled and/or disabled, arranged in a picture displaying order or a picture decoding order.

Optionally, the apparatus may further include an output component, configured to output the bitstream into which the identification and control information is written.

The apparatus in the embodiment may be a relevant bitstream generation device, such as a mobile phone, a computer, a server, a set-top box, a portable mobile terminal, a digital camera and a television broadcast system device, in a video communication application. The apparatus may be located in a source device, and the output apparatus may process at least one of the following multi-layer video signals: a scalable video signal, a multi-view video signal, a multi-view video depth signal, and a multi-view video and multi-view depth signal, wherein a stereoscopic video is a special form of a multi-view video of which a view number is equal to 2.

Embodiment 3

In correspondence to the method provided according to the embodiment 1, a bitstream processing method is provided according to the embodiment of the present disclosure. The method is configured to process the generated bitstream.

Figure 3:
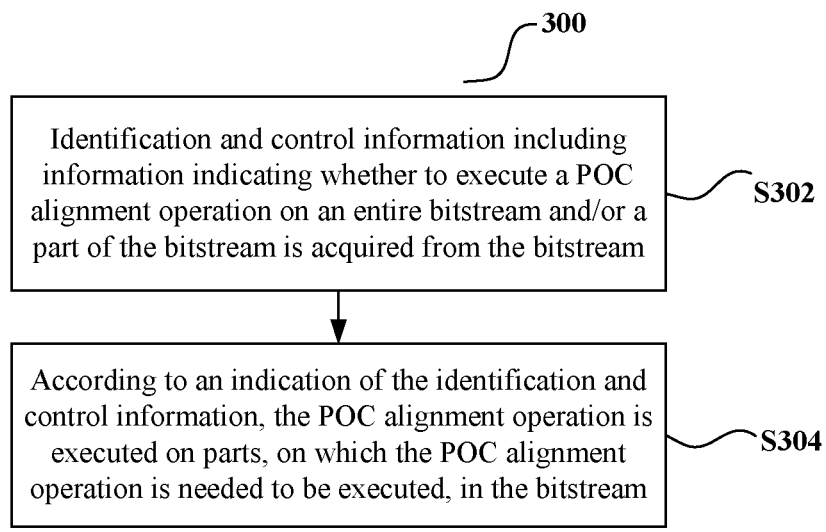
FIG. 3 is a flow chart of a bitstream processing method 300 according to an embodiment of the present disclosure.

FIG. 3 is a flow chart of a bitstream processing method 300 according to an embodiment of the present disclosure. As shown in FIG. 3, a multi-layer video bitstream processing method 300 according to the embodiment of the present disclosure mainly includes Step S302 and Step S304. In Step S302, identification and control information including information indicating whether to execute a POC alignment operation on an entire bitstream and/or a part of the bitstream is acquired from the bitstream. Then, in Step S304, according to an indication of the identification and control information, the POC alignment operation is executed on parts, on which the POC alignment operation is needed to be executed, in the bitstream.

In the embodiment, in correspondence to the embodiment 1, the identification and control information may be acquired from a plurality of fields of the bitstream to indicate an effective range of the identification and control information, which specifically correspond to the fields into which the identification and control information may be written as described in the embodiment 1 and will not be elaborated in the embodiment.

Optionally, in correspondence to the embodiment 1, the identification and control information is written into different positions of the bitstream to indicate whether different parts of the bitstream execute the POC alignment operation, Step S304 may include that: according to an effective range of one or more fields from which the identification and control information is acquired and a value of the identification and control information, pictures, for which the POC alignment operation is enabled and/or disabled, in the bitstream are determined; and the POC alignment operation is executed on the pictures for which the POC alignment operation is enabled.

Embodiment 4

According to the embodiment of the present disclosure, a bitstream processing apparatus is also provided, which is configured to implement the method provided according to the embodiment 3.

Figure 4:
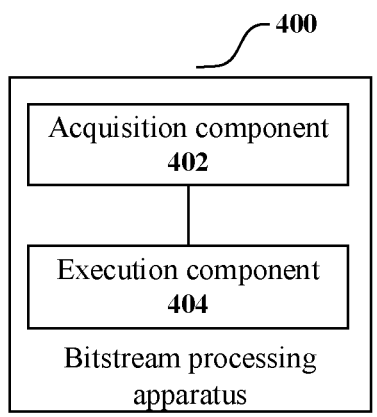
FIG. 4 is a structural diagram of a bitstream processing apparatus 400 according to an embodiment of the present disclosure.

FIG. 4 is a structural diagram of a bitstream processing apparatus 400 according to an embodiment of the present disclosure. As shown in FIG. 4, the processing apparatus 400 mainly includes: an acquisition component 402 and an execution component 404. It will be appreciated that a connection relationship between both components shown in FIG. 4 is merely exemplary. Those skilled in the art may completely adopt other connection relationships as long as each component can achieve functions of the present disclosure under such connection relationships.

In the description, a function of each component may be implemented by means of dedicated hardware or hardware capable of being combined with appropriate software to execute processing. The hardware or the dedicated hardware may include an ASIC, various other circuits, various processors and the like. When being implemented by processors, the function may be provided by a single dedicated processor, a single shared processor, or a plurality of independent processors (some processors therein being probably shared). In addition, the processors shall not be interpreted as specially referring to hardware capable of executing software, and may implicitly include, but is not limited to, DSP hardware, an ROM configured to store software, an RAM and a non-volatile storage device instead.

In the embodiment of the present disclosure, the acquisition component 402 is configured to acquire identification and control information, including information indicating whether to execute a POC alignment operation on an entire bitstream and/or a part of the bitstream, from the bitstream; and the execution component 406 is configured to execute, according to an indication of the identification and control information, the POC alignment operation on parts, on which the POC alignment operation is needed to be executed, in the bitstream.

Optionally, the execution component 404 may include: a determination component, configured to determine, according to an effective range of one or more fields from which the identification and control information is acquired and a value of the identification and control information, pictures, for which the POC alignment operation is enabled and/or disabled, in the multi-layer video bitstream; and a control component, configured to execute the POC alignment operation on the pictures for which the POC alignment operation is enabled.

The apparatus in the embodiment may be a relevant bitstream receiving and displaying device, such as a mobile phone, a computer, a server, a set-top box, a portable mobile terminal, a digital camera and a television broadcast system device, in a video communication application. The apparatus may be located in a destination device, and the processing apparatus may process at least one of the following multi-layer video signals: a scalable video signal, a multi-view video signal, a multi-view video depth signal, and a multi-view video and multi-view depth signal, wherein a stereoscopic video is a special form of a multi-view video of which a view number is equal to 2.

Embodiment 5

According to the embodiment of the present disclosure, a communication system using a bitstream is also provided.

Figure 5:
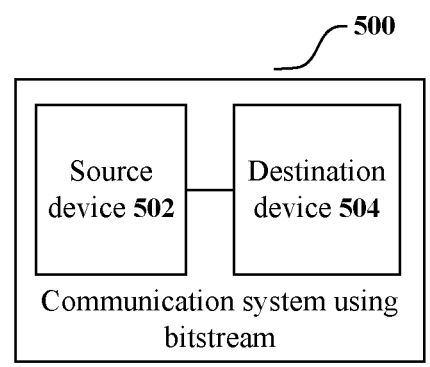
FIG. 5 is a structural diagram of a communication system 500 using a bitstream according to an embodiment of the present disclosure.

FIG. 5 is a structural diagram of a communication system 500 using a bitstream according to an embodiment of the present disclosure. As shown in FIG. 5, a transmission system 500 for a multi-layer video bitstream according to the embodiment of the present disclosure includes a source device 502 and a destination device 504, wherein the source device 502 includes the bitstream generation apparatus 200 according to the embodiment 2, and the destination device 504 includes the bitstream processing apparatus 400 according to the embodiment 4. In the embodiment, the source device 502 may generate a bitstream in accordance with the method according to the embodiment 1 and then output the bitstream, and the destination device 504 receives the bitstream and processes the bitstream in accordance with the method according to the embodiment 3, which specifically refers to the above embodiments and will not be elaborated in the embodiment.

In order to further illustrate the technical solutions provided in the embodiment of the present disclosure, the technical solutions provided in the embodiment of the present disclosure will be described below by means of specific examples.

A high-level bitstream organization method for a POC alignment operation, used in the following examples, adopts structures shown in Table 1 and Table 2.

Each of bitstreams shown in Table 1 and Table 2 contains: identification information identifying whether a POC alignment operation is performed on the entire bitstream and/or a part of the bitstream. The corresponding bitstream carries the following bit fields: one or more bit fields of information identifying whether the POC alignment operation is performed on the entire bitstream and/or a part of the bitstream.

A bitstream shown in Table 3 contains: start and/or end position information of enabling or disabling of the POC alignment operation. The corresponding bitstream carries the following bit fields: one or more bit fields of the start and/or end position information of enabling or disabling of the POC alignment operation.

TABLE 1

Bitstream organization method enabling POC alignment

|  | Descriptor |
|---|---|
| ... |  |
| poc_alignment_enable_flag | u(1) |
| ... |  |

TABLE 2

Bitstream organization method disabling POC alignment

|  | Descriptor |
|---|---|
| ... |  |
| poc_alignment_disable_flag | u(1) |
| ... |  |

TABLE 3

Bitstream organization method for start/end position associated with POC alignment

|  | Descriptor |
|---|---|
| ... |  |
| start_info | se(v) |
| end_info | se(v) |
| ... |  |

Wherein, semantics (corresponding control operations) of all syntax fields in Table 1 are as follows. When a value of poc_alignment_enable_flag is equal to 1, it indicates that it is needed to use a POC alignment operation in a bitstream decoding process. When the value of poc_alignment_enable_flag is equal to 0, it indicates that the POC alignment operation is not used in the bitstream decoding process. Certainly, for those skilled in the art, the value of poc_alignment_enable_flag and a meaning indicated thereby may also adopt other modes, which will not be limited in the embodiment of the present disclosure specifically. poc_alignment_enable_flag uses a coding/decoding method corresponding to u(1).

Optionally, if a bit field corresponding to poc_alignment_enable_flag does not exist in the bitstream, a value of a corresponding variable poc_alignment_enable_flag is inferred to be 1.

Semantics (corresponding control operations) of all fields in Table 2 are as follows. When a value of poc_alignment_disable_flag is equal to 1, it indicates that a POC alignment operation is not used in a bitstream decoding process. When the value of poc_alignment_disable_flag is equal to 0, it indicates that the POC alignment operation is needed to be used in the bitstream decoding process. poc_alignment_disable_flag uses a coding/decoding method corresponding to u(1). Optionally, if a bit field corresponding to poc_alignment_disable_flag does not exist in the bitstream, a value of a corresponding variable poc_alignment_disable_flag is inferred to be 0. Certainly, for those skilled in the art, the value of poc_alignment_disable_flag and a meaning indicated thereby may also adopt other modes, which will not be limited in the embodiment of the present disclosure specifically.

Semantics (corresponding control operations) of all fields in Table 3 are as follows. start_info indicates a start picture position for enabling or disabling the POC alignment operation. start_info uses a coding/decoding method corresponding to se(v). end_info indicates an end picture position for enabling or disabling the POC alignment operation. end_info uses the coding/decoding method corresponding to se(v).

The fields in Table 3 may be combined with the fields in the Table 1 and Table 2 for use. When the fields Table 3 are combined with the fields in the Table 1 for use, a start picture position and an end picture position for enabling the POC alignment operation are indicated. When the fields Table 3 are combined with the fields in the Table 2 for use, a start picture position and an end picture position for disabling the POC alignment operation are indicated.

In Table 3, the start picture positions and the end picture positions may use one or more identifiers in the following information, including: a POC value of a picture, a POC LSB value, POC MSB information, picture timecode information, picture decoding order information and picture displaying order information.

Syntax elements in Table 1, Table 2 and Table 3 may be used in one or more of the following data structures, and bit fields corresponding to the syntax elements in Table 1, Table 2 and Table 3 are used in a bitstream corresponding to the data structures:

(1) a VPS;
(2) an SPS;
(3) a PPS;
(4) SEI;
(5) other data structures acting on at least one picture (a frame picture and/or a field picture), except the above data structures;
(6) a system layer descriptor;
(7) a file descriptor; and
(8) mixed usage.

Descriptions for each of the above methods are merely specific examples corresponding to the methods. When a plurality of methods are used simultaneously, the examples for all of the methods may be simply combined and connected in section, and corresponding examples may be obtained.

In the following implementation method, bitstream fields in Table 1 and Table 2 are not located in the same data structure. The following implementation method is illustrated by taking a bitstream field poc_alignment_enable_flag in Table 1 as an example. An implementation method corresponding to a bitstream field poc_alignment_disable_flag in Table 2 is identical thereto. poc_alignment_disable_flag and poc_alignment_enable_flag are different in value under the same circumstance.

Example 1

In the example, poc_alignment_enable_flag is located in a VPS, and a control range thereof covers all layers of a multi-layer video. When the value of poc_alignment_enable_flag is equal to 1, it indicates that pictures within the same AU have identical POC values. When the value of poc_alignment_enable_flag is equal to 0, it indicates that pictures within the same AU probably have identical POC values or probably have different POC values.

After the poc_alignment_enable_flag field, bit fields in Table 3 may be further selected for use, and a start picture position and an end picture position of an operation corresponding to poc_alignment_enable_flag are further identified. When the bit fields in Table 3 exist, an effective range of the operation limited by poc_alignment_enable_flag covers a start picture and an end picture, indicated by the bit fields in Table 3, and all pictures therebetween (arranged in a picture displaying order or a picture decoding order).

In the example, transmission of a multi-layer video bitstream mainly includes the steps as follows.

Step 1: A source device judges whether it is needed to execute a POC alignment operation on a multi-layer video according to an application requirement (indicating, for example, whether to decode and output pictures on multiple or all layers simultaneously).

If it is needed to use the POC alignment operation, the source device sets a value of poc_alignment_enable_flag as 1, and otherwise, the source device sets the value of poc_alignment_enable_flag as 0.

Step 2: The source device writes the value of poc_alignment_enable_flag into a VPS bitstream by means of a coding method corresponding to u(1).

Step 3: According to a predictive structure and the application requirement, the source device determines whether to make a section of successive pictures (arranged in a picture displaying order or a picture decoding order) so as to execute an operation indicated by the value of poc_alignment_enable_flag. If so, according to the predictive structure and the application requirement, the source device determines values of start_info and end_info, and writes the values of start_info and end_info into the bitstream by means of a coding method corresponding to se(v).

Step 4: After receiving the bitstream, a destination device acquires the value of poc_alignment_enable_flag from the VPS bitstream by means of a decoding method corresponding to u(1).

When fields shown in Table 3 exist in the bitstream, the destination device acquires the values of start_info and end_info from the bitstream by means of a decoding method corresponding to se(v). The destination device determines an effective picture range of the operation corresponding to the value of poc_alignment_enable_flag according to the values of start_info and end_info. If the fields shown in Table 3 are not contained in the bitstream, the destination device sets an effective range of the operation corresponding to the value of poc_alignment_enable_flag as an entire Coded Video Sequence (CVS).

When judging that the value of poc_alignment_enable_flag is 1, the destination device may perform AU boundary division on a video bitstream by means of POC conditions.

The destination device sets equality of POC values of output pictures of the same AU as a bitstream error-detection and displaying operation control condition. If the decoded bitstream does not meet the control condition, the destination device executes an error control mechanism, performs error concealment and/or reports an error to the source device via feedback information. The destination device may directly perform picture output and displaying control according to the POC values.

When judging that the value of poc_alignment_enable_flag is 0, the destination device may perform AU boundary division on the video bitstream by means of non-POC conditions. If timing information in a system layer or file corresponding to a picture obtained by the same AU is identical, the destination device performs picture output and displaying control at a moment indicated by the timing information.

Example 2

In the example, poc_alignment_enable_flag is located in an SPS, and a control range thereof covers a layer of a multi-layer video using the SPS. When the value of poc_alignment_enable_flag is equal to 1, it indicates that a picture on this layer in an AU and a picture on a BL (existing or hypothetically existing in the AU) have identical POC values. When the value of poc_alignment_enable_flag is equal to 0, it indicates that the picture on this layer in the AU and the picture on the BL (existing or hypothetically existing in the AU) probably have identical POC values or probably have different POC values.

After the poc_alignment_enable_flag field, bit fields in Table 3 may be further selected for use, and a start picture position and an end picture position of an operation corresponding to poc_alignment_enable_flag are further identified. When the bit fields in Table 3 exist, an effective range of the operation limited by poc_alignment_enable_flag covers a start picture and an end picture, indicated by the bit fields in Table 3, and all pictures therebetween (arranged in a picture displaying order or a picture decoding order).

In the example, transmission of a multi-layer video bitstream mainly includes the steps as follows.

Step 1: According to an application requirement (indicating, for example, whether to decode and output pictures on multiple or all layers simultaneously), a source device judges whether it is needed to execute a POC alignment operation on a picture on this layer and a picture on a BL.

If it is needed to use the POC alignment operation, the source device sets a value of poc_alignment_enable_flag in an SPS used by this layer as 1, and otherwise, the source device sets the value of poc_alignment_enable_flag as 0.

Step 2: The source device writes the value of poc_alignment_enable_flag into an SPS bitstream by means of a coding method corresponding to u(1).

Step 3: According to a predictive structure and the application requirement, the source device determines whether to make a section of successive pictures (arranged in a picture displaying order or a picture decoding order) so as to execute an operation indicated by the value of poc_alignment_enable_flag. If so, according to the predictive structure and the application requirement, the source device determines values of start_info and end_info, and writes the values of start_info and end_info into the bitstream by means of a coding method corresponding to se(v).

Step 4: After receiving the bitstream, a destination device acquires the value of poc_alignment_enable_flag from the SPS bitstream by means of a decoding method corresponding to u(1).

When fields shown in Table 3 exist in the bitstream, the destination device acquires the values of start_info and end_info from the bitstream by means of a decoding method corresponding to se(v). The destination device determines an effective picture range of the operation corresponding to the value of poc_alignment_enable_flag according to the values of start_info and end_info. If the fields shown in Table 3 are not contained in the bitstream, the destination device sets an effective range of the operation corresponding to the value of poc_alignment_enable_flag as an entire CVS.

When judging that the value of poc_alignment_enable_flag is 1, the destination device may perform AU boundary division on a video bitstream by means of POC conditions. The destination device sets equality of POC values of an output picture on this layer in the AU and the picture on the BL (hypothetical existence) as a bitstream error-detection and displaying operation control condition. If the decoded bitstream does not meet the control condition, the destination device executes an error control mechanism, performs error concealment and/or reports an error to the source device via feedback information. The destination device may directly perform output and displaying control on the picture on this layer and the picture on the BL according to the POC values. The destination device performs output and displaying control on other pictures, located in the same AU but having unequal POC values, at a moment indicated by timing information.

When judging that the value of poc_alignment_enable_flag is 0, the destination device may perform AU boundary division on the video bitstream by means of non-POC conditions. If timing information in a system layer or file corresponding to a picture obtained by the same AU is identical, the destination device performs picture output and displaying control at a moment indicated by the timing information.

Embodiment 3

In the example, poc_alignment_enable_flag is located in a PPS, and a control range thereof covers one or more pictures in a layer of a multi-layer video using the PPS. When the value of poc_alignment_enable_flag is equal to 1, it indicates that a picture on this layer in an AU and a picture on a BL (existing or hypothetically existing in the AU) have identical POC values. When the value of poc_alignment_enable_flag is equal to 0, it indicates that the picture on this layer in the AU and the picture on the BL (existing or hypothetically existing in the AU) probably have identical POC values or probably have different POC values.

After the poc_alignment_enable_flag field, bit fields in Table 3 may be further selected for use, and a start picture position and an end picture position of an operation corresponding to poc_alignment_enable_flag are further identified. When the bit fields in Table 3 exist, an effective range of the operation limited by poc_alignment_enable_flag covers a start picture and an end picture, indicated by the bit fields in Table 3, and all pictures therebetween (arranged in a picture displaying order or a picture decoding order).

In the example, transmission of a multi-layer video bitstream mainly includes the steps as follows.

Step 1: According to an application requirement (indicating, for example, whether to decode and output pictures on multiple or all layers simultaneously), a source device judges whether it is needed to execute a POC alignment operation on a certain picture or a certain section of pictures on this layer and a picture on a BL.

If it is needed to use the POC alignment operation, the source device sets a value of poc_alignment_enable_flag in an SPS used by this layer as 1, and otherwise, the source device sets the value of poc_alignment_enable_flag as 0.

Step 2: The source device writes the value of poc_alignment_enable_flag into a PPS bitstream by means of a coding method corresponding to u(1).

Step 3: According to a predictive structure and the application requirement, the source device determines whether to make a section of successive pictures (arranged in a picture displaying order or a picture decoding order) so as to execute an operation indicated by the value of poc_alignment_enable_flag. If so, according to the predictive structure and the application requirement, the source device determines values of start_info and end_info, and writes the values of start_info and end_info into the bitstream by means of a coding method corresponding to se(v).

Step 4: After receiving the bitstream, a destination device acquires the value of poc_alignment_enable_flag from the PPS bitstream by means of a decoding method corresponding to u(1).

When fields shown in Table 3 exist in the bitstream, the destination device acquires the values of start_info and end_info from the bitstream by means of a decoding method corresponding to se(v). The destination device determines an effective picture range of the operation corresponding to the value of poc_alignment_enable_flag according to the values of start_info and end_info. If the fields shown in Table 3 are not contained in the bitstream, the destination device sets an effective range of the operation corresponding to the value of poc_alignment_enable_flag as an entire CVS.

When judging that the value of poc_alignment_enable_flag is 1, the destination device may perform AU boundary division on a video bitstream by means of POC conditions. The destination device sets equality of POC values of an output picture on this layer in the AU and the picture on the BL (hypothetical existence) as a bitstream error-detection and displaying operation control condition. If the decoded bitstream does not meet the control condition, the destination device executes an error control mechanism, performs error concealment and/or reports an error to the source device via feedback information. The destination device may directly perform output and displaying control on the picture on this layer and the picture on the BL according to the POC values. The destination device performs output and displaying control on other pictures, located in the same AU but having unequal POC values, at a moment indicated by timing information.

When judging that the value of poc_alignment_enable_flag is 0, the destination device may perform AU boundary division on the video bitstream by means of non-POC conditions. If timing information in a system layer or file corresponding to a picture obtained by the same AU is identical, the destination device performs picture output and displaying control at a moment indicated by the timing information.

Example 4

In the example, poc_alignment_enable_flag is located in SEI, and an indication range thereof covers one or more pictures in a layer of a multi-layer video using the SEI. When the value of poc_alignment_enable_flag is equal to 1, it indicates that all pictures in an AU have identical POC values (SEI associated with the entire AU) or it indicates that a picture on a certain EL and a picture on a BL (existing or hypothetically existing in the AU) have identical POC values (SEI associated with the certain EL). When the value of poc_alignment_enable_flag is equal to 0, it indicates that the all pictures in the AU probably have identical POC values or probably have different POC values (the SEI associated with the entire AU), or it indicates that the picture on the certain EL and the picture on the BL (existing or hypothetically existing in the AU) probably have identical POC values or probably have different POC values (the SEI associated with the certain EL).

After the poc_alignment_enable_flag field, bit fields in Table 3 may be further selected for use, and a start picture position and an end picture position of an operation corresponding to poc_alignment_enable_flag are further identified. When the bit fields in Table 3 exist, an effective range of the operation limited by poc_alignment_enable_flag covers a start picture and an end picture, indicated by the bit fields in Table 3, and all pictures therebetween (arranged in a picture displaying order or a picture decoding order).

In the example, transmission of a multi-layer video bitstream mainly includes the steps as follows.

Step 1: According to a generated multi-layer video coding bitstream, a source device judges whether it is needed to execute a POC alignment operation on a certain picture or a certain section of pictures.

If it is needed to use the POC alignment operation, the source device sets a value of poc_alignment_enable_flag in corresponding SEI, and otherwise, the source device sets the value of poc_alignment_enable_flag as 0. The corresponding SEI refers to: SEI associated with an entire AU or SEI associated with a certain EL.

Step 2: The source device writes the value of poc_alignment_enable_flag into an SEI bitstream by means of a coding method corresponding to u(1).

Step 3: According to a predictive structure and the application requirement, the source device determines whether to make a section of successive pictures (arranged in a picture displaying order or a picture decoding order) so as to execute an operation indicated by the value of poc_alignment_enable_flag. If so, according to the predictive structure and the application requirement, the source device determines values of start_info and end_info, and writes the values of start_info and end_info into the bitstream by means of a coding method corresponding to se(v).

Step 4: After receiving the bitstream, a destination device acquires the value of poc_alignment_enable_flag from the SEI bitstream by means of a decoding method corresponding to u(1).

When fields shown in Table 3 exist in the bitstream, the destination device acquires the values of start_info and end_info from the bitstream by means of a decoding method corresponding to se(v). The destination device determines an effective picture range of the operation corresponding to the value of poc_alignment_enable_flag according to the values of start_info and end_info. If the fields shown in Table 3 are not contained in the bitstream, the destination device sets an effective range of the operation corresponding to the value of poc_alignment_enable_flag as an entire CVS.

When judging that the value of poc_alignment_enable_flag is 1, if the SEI is the SEI associated with the entire AU, the destination device may perform AU boundary division on a video bitstream by means of POC conditions. The destination device sets equality of POC values of output pictures of the same AU as a bitstream error-detection and displaying operation control condition. If the decoded bitstream does not meet the control condition, the destination device executes an error control mechanism, performs error concealment and/or reports an error to the source device via feedback information. The destination device may directly perform picture output and displaying control according to the POC values.

When judging that the value of poc_alignment_enable_flag is 1, if the SEI is the SEI associated with the certain EL, the destination device may perform AU boundary division on a video bitstream by means of non-POC conditions. The destination device sets equality of POC values of an output picture on this layer in the AU and the picture on the BL (hypothetical existence) as a bitstream error-detection and displaying operation control condition. If the decoded bitstream does not meet the control condition, the destination device executes an error control mechanism, performs error concealment and/or reports an error to the source device via feedback information. The destination device may directly perform output and displaying control on the picture on this layer and the picture on the BL according to the POC values. The destination device performs output and displaying control on other pictures, located in the same AU but having unequal POC values, at a moment indicated by timing information.

When judging that the value of poc_alignment_enable_flag is 0, the destination device may perform AU boundary division on the video bitstream by means of non-POC conditions. If timing information in a system layer or file corresponding to a picture obtained by the same AU is identical, the destination device performs picture output and displaying control at a moment indicated by the timing information.

Example 5

In the example, the identification information is located at other data structures acting on at least one picture (a frame picture and/or a field picture), if each of the other data structures acting on at least one picture (the frame picture and/or the field picture) contains data information which needs to be used in other decoding processes, the data structure is a necessary data structure in the decoding processes. In this case, if an effective range of the data structure covers an entire multi-layer video, a method for operating poc_alignment_enable_flag via a source device and a destination device is similar to that in the example 1. If the effective range of the data structure covers a certain EL video in the multi-layer video, a method for operating poc_alignment_enable_flag via a source device and a destination device is similar to that in the example 2. If the effective range of the data structure covers one or more pictures on a certain EL in the entire multi-layer video, a method for operating poc_alignment_enable_flag via a source device and a destination device is similar to that in the example 3.

If each of the other data structures acting on at least one picture (the frame picture and/or the field picture) does not contain the data information which needs to be used in the other decoding processes, the data structure is not the necessary data structure in the decoding processes. In this case, a method for operating poc_alignment_enable_flag via a source device and a destination device is similar to that in the example 4.

After the poc_alignment_enable_flag field, bit fields in Table 3 may be further selected for use, and a start picture position and an end picture position of an operation corresponding to poc_alignment_enable_flag are further identified. When the bit fields in Table 3 exist, an effective range of the operation limited by poc_alignment_enable_flag covers a start picture and an end picture, indicated by the bit fields in Table 3, and all pictures therebetween (arranged in a picture displaying order or a picture decoding order).

Different from the examples 1 to 4, the example 5 is characterized in that the source device writes a value of poc_alignment_enable_flag into a bitstream corresponding to the data structures containing at least one picture (the frame picture and/or the field picture) by means of a coding method corresponding to u(1), and the destination device parses a field corresponding to poc_alignment_enable_flag from the bitstream corresponding to the data structures containing at least one picture (the frame picture and/or the field picture) by means of a decoding method corresponding to u(1) to obtain the value of poc_alignment_enable_flag.

Example 6

In the example, the identification information is located in a system descriptor, and when an effective range of a descriptor containing poc_alignment_enable_flag covers an entire multi-layer video coding bitstream in a system bitstream, a method for operating poc_alignment_enable_flag via a source device and a destination device is similar to an operation method, under the condition of SEI associated with an entire AU, in the example 4.

When the effective range of the descriptor containing poc_alignment_enable_flag covers a certain EL bitstream in the multi-layer video coding bitstream in the system bitstream, a method for operating poc_alignment_enable_flag via a source device and a destination device is similar to an operation method, under the condition of SEI associated with a certain EL, in the example 4.

Different from the example 4, the example 6 is characterized in that the source device writes a value of poc_alignment_enable_flag into the system bitstream corresponding to the descriptor by means of a coding method corresponding to or identical to u(1), and if necessary, the source device writes values of start_info and end_info into the system bitstream corresponding to the descriptor by means of a coding method corresponding to or identical to se(v); and the destination device parses a field corresponding to poc_alignment_enable_flag from the system bitstream corresponding to a data structure of the descriptor by means of a decoding method corresponding to or identical to u(1) to obtain the value of poc_alignment_enable_flag. If fields in Table 3 exist in the bitstream, the destination device acquires the values of start_info and end_info from the bitstream by means of a decoding method corresponding to and/or identical to se(v).

Example 7

In the example, the identification information is located in a file descriptor. In the example, when an effective range of a descriptor containing poc_alignment_enable_flag covers an entire multi-layer video coding bitstream in a media file bitstream, a method for operating poc_alignment_enable_flag via a source device and a destination device is similar to an operation method, under the condition of SEI associated with an entire AU, in the example 4.

When the effective range of the descriptor containing poc_alignment_enable_flag covers a certain EL bitstream in the multi-layer video coding bitstream in the media file bitstream, a method for operating poc_alignment_enable_flag via a source device and a destination device is similar to an operation method, under the condition of SEI associated with a certain EL, in the example 4.

Different from the example 4, the example 7 is characterized in that the source device writes a value of poc_alignment_enable_flag into a system bitstream corresponding to the descriptor by means of a coding method corresponding to or identical to u(1), and if necessary, the source device writes values of start_info and end_info into the system bitstream corresponding to the descriptor by means of a coding method corresponding to or identical to se(v); and the destination device parses a field corresponding to poc_alignment_enable_flag from the system bitstream corresponding to a data structure of the descriptor by means of a decoding method corresponding to or identical to u(1) to obtain the value of poc_alignment_enable_flag. If fields in Table 3 exist in the bitstream, the destination device acquires the values of start_info and end_info from the bitstream by means of a decoding method corresponding to and/or identical to se(v).

Example 8

In the example, the identification information is carried by means of a mixed usage method. In a decoding process for a multi-layer video coding bitstream, a PPS refers to an SPS, and the SPS refers to a VPS. Here, the VPS is called a data structure higher than the SPS and the PPS, and the SPS is a data structure higher than the PPS.

In the example, poc_alignment_enable_flag may be coded in different layers of data structures. When values of poc_alignment_enable_flag in a high-layer data structure and a low-layer data structure are different, poc_alignment_enable_flag in the low-layer data structure overrides poc_alignment_enable_flag in the high-layer data structure. If values of start_info and end_info in Table 3 are different, the effective range of the value of poc_alignment_enable_flag is a minimum intersection between a limited picture range of start_info and end_info in the high-layer data structure and a limited picture range of start_info and end_info in the low-layer data structure.

When the values of poc_alignment_enable_flag in the high-layer data structure and the low-layer data structure are identical but the values of start_info and end_info in Table 3 are different, the effective range of the value of poc_alignment_enable_flag is a maximum union between the limited picture range of start_info and end_info in the high-layer data structure and the limited picture range of start_info and end_info in the low-layer data structure.

In the mixed usage method, according to an input video, a coding predictive structure and an application requirement, a source device determines a usage mode of POC alignment, including a layer using POC alignment and start/end positions of a picture using POC alignment. The source device sets values of poc_alignment_enable_flag in the VPS, the SPS and the PPS and values of needed start_info and end_info by means of the methods in the example 1, the example 2 and the example 3 according to the information determined above, and writes the values into a bitstream by means of corresponding coding methods. Meanwhile, the source device sets auxiliary information needed by a video bitstream and corresponding field information in descriptors relevant to a system layer and a media file by means of the methods in the example 4, the example 6 and the example 7 according to the application requirement, and writes the information into the bitstream by means of corresponding coding methods.

A destination device processes the received bitstream, acquires the values of poc_alignment_enable_flag from the VPS, the SPS and the PPS and the values of needed start_info and end_info by means of the methods in the example 1, the example 2 and the example 3, sets POC alignment usage control over different picture sections and layers, and decodes the received bitstream. In a decoding process, when the destination device may obtain POC alignment description information in video auxiliary information, system layer information and media file information, the destination device sets error control and displaying control components in the receiving and decoding processes by means of each of the above methods.

The destination device may perform AU boundary division on a video bitstream by means of non-POC conditions. The destination device sets equality of POC values of an output picture on this layer in an AU and a picture on a BL (hypothetical existence) as a bitstream error-detection and displaying operation control condition. If the decoded bitstream does not meet the control condition, the destination device executes an error control mechanism, performs error concealment and/or reports an error to the source device via feedback information. The destination device may directly perform output and displaying control on the picture on this layer and the picture on the BL according to the POC values. The destination device performs output and displaying control on other pictures, located in the same AU but having unequal POC values, at a moment indicated by timing information.

When judging that the value of poc_alignment_enable_flag is 0, the destination device may perform AU boundary division on the video bitstream by means of non-POC conditions. If timing information in a system layer or file corresponding to a picture obtained by the same AU is identical, the destination device performs picture output and displaying control at a moment indicated by the timing information.

From the above descriptions, it can be seen that by means of the technical solutions provided in one of the above embodiments, for instant messaging and other services, a user can obtain information (for example, a name or nickname of a terminal) of each terminal of an opposite party before communication, so that the user can actively select a terminal of a communication receiving party for communication, can obtain names (nicknames) of a plurality of terminals of the communication receiving party before communicating with the opposite party, and can select one of the terminals to initiate a communication (a voice call, a video call or a message) in a targeted manner, thereby improving the user experience.

In conclusion, by means of the methods provided according to the embodiments of the present disclosure, descriptions for POC alignment may be added to bitstream high-level descriptions, auxiliary information descriptions, system layer descriptions and the like. Meanwhile, a layered description mechanism is adopted on a bitstream high-level structure, thereby aiding in flexible control in a bitstream generation process.

Obviously, those skilled in the art shall understand that all components or all steps in the present disclosure may be implemented by using a general calculation apparatus, may be centralized on a single calculation apparatus or may be distributed on a network composed of a plurality of calculation apparatuses. Optionally, they may be implemented by using executable program codes of the calculation apparatuses. Thus, they may be stored in a storage apparatus and executed by the calculation apparatuses, the shown or described steps may be executed in a sequence different from this sequence under certain conditions, or they are manufactured into each integrated circuit component respectively, or a plurality of components or steps therein are manufactured into a single integrated circuit component. Thus, the present disclosure is not limited to the combination of any specific hardware and software.

The above is only the preferred embodiments of the present disclosure, and is not intended to limit the present disclosure. There may be various modifications and variations in the present disclosure for those skilled in the art. Any modifications, equivalent replacements, improvements and the like within the principle of the present disclosure shall fall within the protection scope defined by the appended claims of the present disclosure.

INDUSTRIAL APPLICABILITY

By means of the technical solutions provided in the embodiments of the present disclosure, when a bitstream is generated, indication and control information indicating whether it is needed to execute a POC alignment operation on the entire bitstream and/or a part of the bitstream is written into the bitstream, so that the POC alignment operation can be partially and/or entirely enabled or disabled, and the flexibility in bitstream control is improved.

What is claimed is:

1. A bitstream generation method, comprising:
an encoder judging whether it is needed to execute a Picture Order Count (POC) alignment operation on an entire bitstream or a part of the bitstream according to an application requirement; and
the encoder writing identification and control information into the bitstream according to a judgment result, wherein the identification and control information comprises: information indicating whether to execute the POC alignment operation on the entire bitstream or a part of the bitstream;
wherein the identification and control information is written into a field, where one or more parameter sets are located, in the bitstream, and is used for indicating whether to execute the POC alignment operation on all or a part of pictures, which use the one or more parameter sets where the identification and control information is located, in the bitstream, wherein the one or more parameter sets comprise at least one of: a Video Parameter Set (VPS), a Sequence Parameter Set (SPS) and a Picture Parameter Set (PPS);
wherein the identification and control information further comprises: start picture position information of enabling or disabling of the POC alignment operation and/or end picture position information of enabling or disabling of the POC alignment operation; and
before the identification and control information is written into the bitstream, the method further comprises: the encoder determining, according to a predictive structure and the application requirement, a start position and/or an end position of a section of successive pictures, for which the POC alignment operation is enabled and/or disabled, arranged in a picture displaying order or a picture decoding order.

2. The method as claimed in claim 1, wherein when multiple parameter sets contain the identification and control information indicating whether to execute the POC alignment operation, according to a referring relationship among the multiple parameter sets, the identification and control information, indicating whether to execute the POC alignment operation, in a current parameter set overrides the corresponding identification and control information, indicating whether to execute the POC alignment operation, in a parameter set to which the current parameter set directly and/or indirectly refers.

3. The method as claimed in claim 1, wherein the identification and control information is written into a field, where Supplemental Enhancement Information (SEI) is located, in the bitstream, and is used for indicating whether to execute the POC alignment operation on all or a part of pictures within an effective range of the SEI of the bitstream.

4. The method as claimed in claim 1, wherein the identification and control information is written into a field, used for describing a video media attribute, of a system layer of the bitstream, and is used for indicating whether to execute the POC alignment operation on all or a part of pictures of the bitstream contained in a system bitstream.

5. The method as claimed in claim 1, wherein the identification and control information is written into a field, used for describing a video media attribute, in a media file of the bitstream, and is used for indicating whether to execute the POC alignment operation on all or a part of pictures of the bitstream contained in the media file.

6. A bitstream generation apparatus executed on an encoder, comprising:
a judgment component, configured to judge whether it is needed to execute a Picture Order Count (POC) alignment operation on an entire bitstream or a part of the bitstream according to an application requirement; and
a writing component, configured to write identification and control information into the bitstream according to a judgment result, wherein the identification and control information comprises: information indicating whether to execute the POC alignment operation on the entire bitstream or a part of the bitstream;
wherein the writing component further is configured to execute following step: writing the identification and control information into a field, where one or more parameter sets are located, in the bitstream, and is used for indicating whether to execute the POC alignment operation on all or a part of pictures, which use the one or more parameter sets where the identification and control information is located, in the bitstream, wherein the one or more parameter sets comprise at least one of: a Video Parameter Set (VPS), a Sequence Parameter Set (SPS) and a Picture Parameter Set (PPS);
wherein the identification and control information further comprises: start picture position information of enabling or disabling of the POC alignment operation and/or end picture position information of enabling or disabling of the POC alignment operation; and
the apparatus further comprises: a determination component, configured to determine, according to a predictive structure and the application requirement, a start position and/or an end position of a section of successive pictures, for which the POC alignment operation is enabled and/or disabled, arranged in a picture displaying order or a picture decoding order.

7. A bitstream processing method, comprising:
a decoder acquiring identification and control information from a bitstream, wherein the identification and control information comprises: information indicating whether to execute a Picture Order Count (POC) alignment operation on the entire bitstream or a part of the bitstream; and
the decoder executing, according to an indication of the identification and control information, the POC alignment operation on all or a part of pictures, on which the POC alignment operation is needed to be executed, in the bitstream;
wherein the identification and control information is acquired from a field, where one or more parameter sets are located, in the bitstream, and is used for indicating whether to execute the POC alignment operation on all or a part of pictures, which use the one or more parameter sets where the identification and control information is located, in the bitstream, wherein the one or more parameter sets comprise at least one of: a Video Parameter Set (VPS), a Sequence Parameter Set (SPS) and a Picture Parameter Set (PPS);
wherein executing the POC alignment operation on all or a part of pictures, on which the POC alignment operation is needed to be executed, in the bitstream according to the indication of the identification and control information comprises: the decoder determining, according to an effective range of one or more fields from which the identification and control information is acquired and a value of the identification and control information, pictures, for which the POC alignment operation is enabled and/or disabled, in the bitstream.

8. The method as claimed in claim 7, wherein when multiple parameter sets contain the identification and control information indicating whether to execute the POC alignment operation, according to a referring relationship among the multiple parameter sets, the identification and control information, indicating whether to execute the POC alignment operation, in a current parameter set overrides the corresponding identification and control information, indicating whether to execute the POC alignment operation, in a parameter set to which the current parameter set directly and/or indirectly refers.

9. The method as claimed in claim 7, wherein the identification and control information is acquired from a field, where Supplemental Enhancement Information (SEI) is located, in the bitstream, and is used for indicating whether to execute the POC alignment operation on all or a part of pictures within an effective range of the SEI of the bitstream.

10. The method as claimed in claim 7, wherein the identification and control information is acquired from a field, used for describing a video media attribute, of a system layer of the bitstream, and is used for indicating whether to execute the POC alignment operation on all or a part of pictures of the bitstream contained in a system bitstream.

11. The method as claimed in claim 7, wherein the identification and control information is acquired from a field, used for describing a video media attribute, in a media file of the bitstream, and is used for indicating whether to execute the POC alignment operation on all or a part of pictures of the bitstream contained in the media file.

12. The method as claimed in claim 7, wherein
the method further comprises:
the decoder executing the POC alignment operation on the pictures for which the POC alignment operation is enabled.

13. A bitstream processing apparatus, executed on a decoder, comprising:
an acquisition component, configured to acquire identification and control information from a bitstream, wherein the identification and control information comprises: information indicating whether to execute a Picture Order Count (POC) alignment operation on the entire bitstream or a part of the bitstream; and
an execution component, configured to execute, according to an indication of the identification and control information, the POC alignment operation on all or a part of pictures, on which the POC alignment operation is needed to be executed, in the bitstream;

wherein acquisition component is further configured to execute following step: acquired the identification and control information from a field, where one or more parameter sets are located, in the bitstream, and is used for indicating whether to execute the POC alignment operation on all or a part of pictures, which use the one or more parameter sets where the identification and control information is located, in the bitstream, wherein the one or more parameter sets comprise at least one of: a Video Parameter Set (VPS), a Sequence Parameter Set (SPS) and a Picture Parameter Set (PPS);

wherein the execution component comprises: a determination component, configured to determine, according to an effective range of one or more fields from which the identification and control information is acquired and a value of the identification and control information, pictures, for which the POC alignment operation is enabled and/or disabled, in the bitstream.

14. The apparatus as claimed in claim 13, wherein the execution component further comprises:

a control component, configured to execute the POC alignment operation on the pictures for which the POC alignment operation is enabled.

* * * * *